(12) United States Patent
Austrheim et al.

(10) Patent No.: US 11,383,926 B2
(45) Date of Patent: Jul. 12, 2022

(54) AUTOMATED STORAGE AND RETRIEVAL SYSTEM

(71) Applicant: Autostore Technology AS, Nedre Vats (NO)

(72) Inventors: Trond Austrheim, Etne (NO); Jørgen Djuve Heggebø, Olen (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/291,483

(22) PCT Filed: Oct. 14, 2019

(86) PCT No.: PCT/EP2019/077739
§ 371 (c)(1),
(2) Date: May 5, 2021

(87) PCT Pub. No.: WO2020/094336
PCT Pub. Date: May 14, 2020

(65) Prior Publication Data
US 2022/0002077 A1    Jan. 6, 2022

(30) Foreign Application Priority Data

Nov. 6, 2018   (NO) .................................. 20181418

(51) Int. Cl.
*B65G 1/04*       (2006.01)
*B66F 9/06*       (2006.01)
*B65G 1/137*      (2006.01)

(52) U.S. Cl.
CPC ......... *B65G 1/0464* (2013.01); *B65G 1/0421* (2013.01); *B65G 1/0485* (2013.01); *B65G 1/1373* (2013.01); *B66F 9/063* (2013.01)

(58) Field of Classification Search
CPC ...................................................... B66F 9/063
See application file for complete search history.

(56) References Cited

U.S. PATENT DOCUMENTS

| | | | | |
|---|---|---|---|---|
| 10,759,597 | B2 * | 9/2020 | Lindbo | ................ B65G 1/0492 |
| 10,829,302 | B2 * | 11/2020 | Lindbo | .................. B65G 57/03 |

(Continued)

FOREIGN PATENT DOCUMENTS

| | | |
|---|---|---|
| GB | 2544648 A | 5/2017 |
| NO | 317366 B1 | 10/2004 |

(Continued)

OTHER PUBLICATIONS

Search Report issued in Norwegian Application No. 20181418, dated May 22, 2019 (2 pages).

(Continued)

*Primary Examiner* — Saul Rodriguez
*Assistant Examiner* — Ashley K Romano
(74) *Attorney, Agent, or Firm* — Osha Bergman Watanabe & Burton LLP

(57) ABSTRACT

A remotely operated vehicle assembly for an automated storage and retrieval system moves a product item between a storage container stored in an automated storage and retrieval grid configured to store a plurality of stacks of storage containers, and target containers. The remotely operated vehicle assembly includes a first vehicle including a vehicle body and a wheel arrangement connected to the vehicle body configured to move the remotely operated vehicle along a rail system of the automated storage and retrieval system; and a picking system for moving the product item. The first vehicle includes a container lifting device configured to carry a first target container. The vehicle assembly further includes a second vehicle including a vehicle body and a wheel arrangement connected to the vehicle body configured to move the remotely operated vehicle along a rail system of the automated storage and retrieval system. The second vehicle includes a container lifting device configured to carry a second target container.

(Continued)

A bar system mechanically connects the vehicles of the vehicle assembly to each other. The picking system is connected to the bar system. The picking system is configured to move the product item from the storage container to one of the first or second target container.

16 Claims, 10 Drawing Sheets

(56) References Cited

U.S. PATENT DOCUMENTS

| | | | | |
|---|---|---|---|---|
| 11,273,980 | B2* | 3/2022 | Ingram-Tedd | B65G 1/0464 |
| 2015/0098775 | A1* | 4/2015 | Razumov | B66F 9/07 |
| | | | | 414/807 |
| 2016/0176632 | A1* | 6/2016 | Manes | G11B 17/225 |
| | | | | 414/277 |
| 2017/0129702 | A1* | 5/2017 | Hognaland | B65G 1/0478 |
| 2017/0305668 | A1* | 10/2017 | Bestic | G05D 1/0297 |
| 2018/0148259 | A1* | 5/2018 | Gravelle | B65G 1/0464 |
| 2019/0084763 | A1* | 3/2019 | Beer | B65G 1/0464 |
| 2021/0309457 | A1* | 10/2021 | Tsuji | B65G 1/0407 |

FOREIGN PATENT DOCUMENTS

| | | |
|---|---|---|
| WO | 2014075937 A1 | 5/2014 |
| WO | 2014090684 A1 | 6/2014 |
| WO | 2015104263 A2 | 7/2015 |
| WO | 2015140216 A1 | 9/2015 |
| WO | 2015193278 A1 | 12/2015 |
| WO | 2016198467 A1 | 12/2016 |
| WO | 2016198565 A1 | 12/2016 |
| WO | 2017129384 A1 | 8/2017 |

OTHER PUBLICATIONS

International Search Report issued in International Application No. PCT/EP2019/077739, dated Jan. 24, 2020 (3 pages).
Written Opinion issued in International Application No. PCT/EP2019/077739; dated Jan. 24, 2020 (6 pages).

* cited by examiner

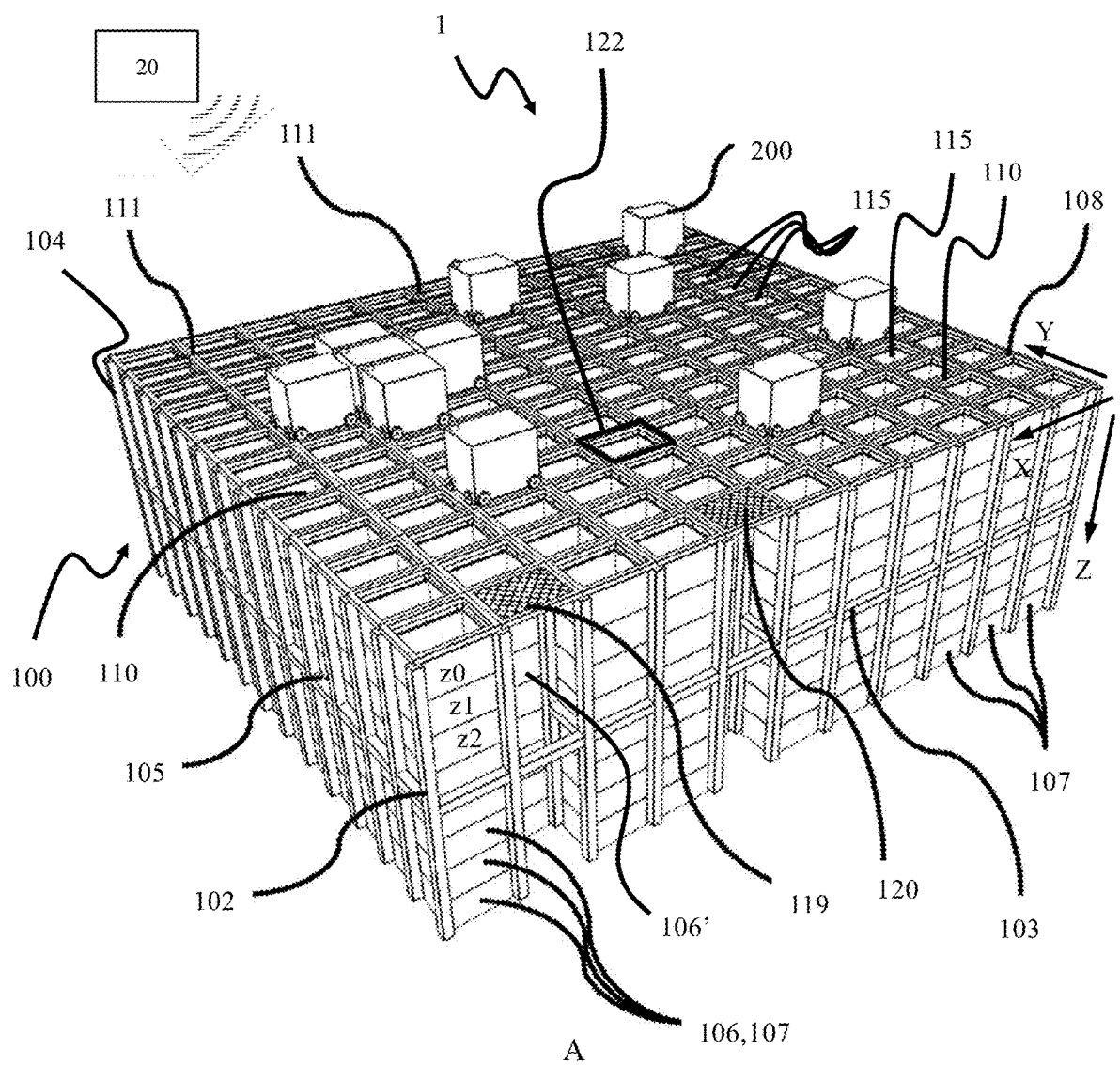
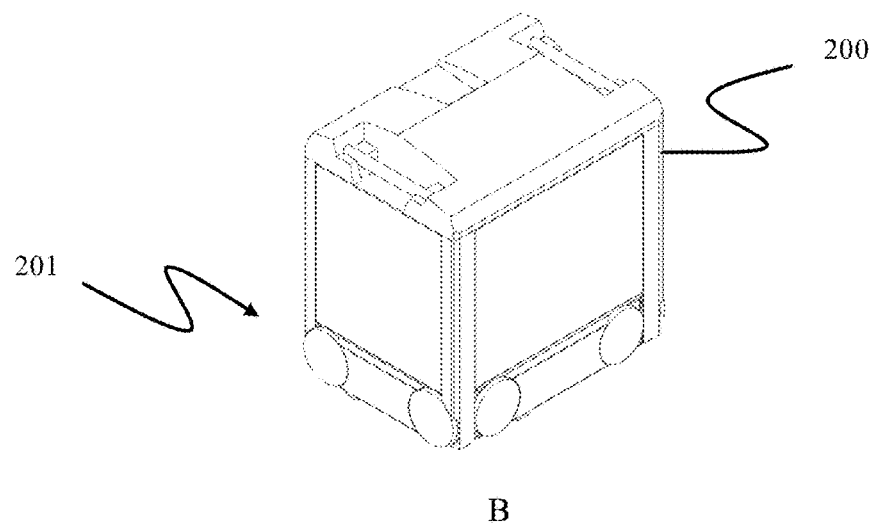
Fig. 1 (Prior Art)

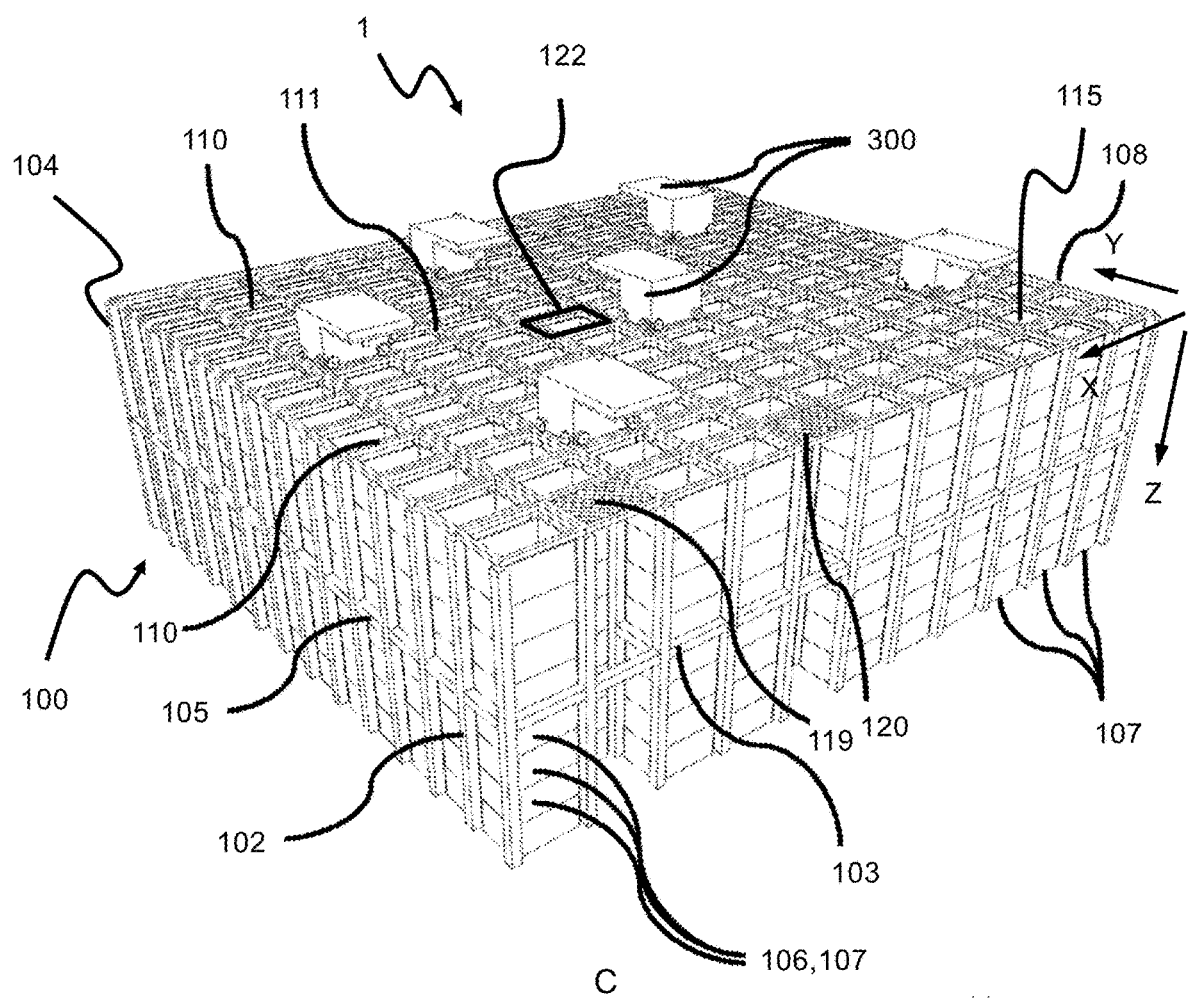
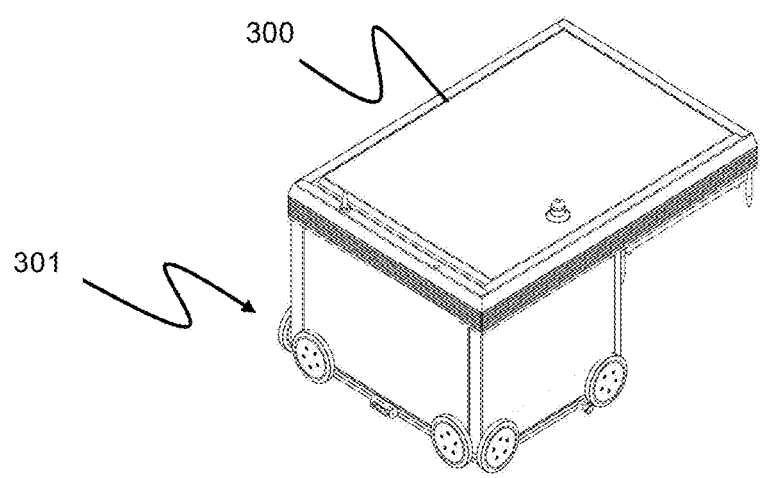
Fig. 1 (Prior Art)

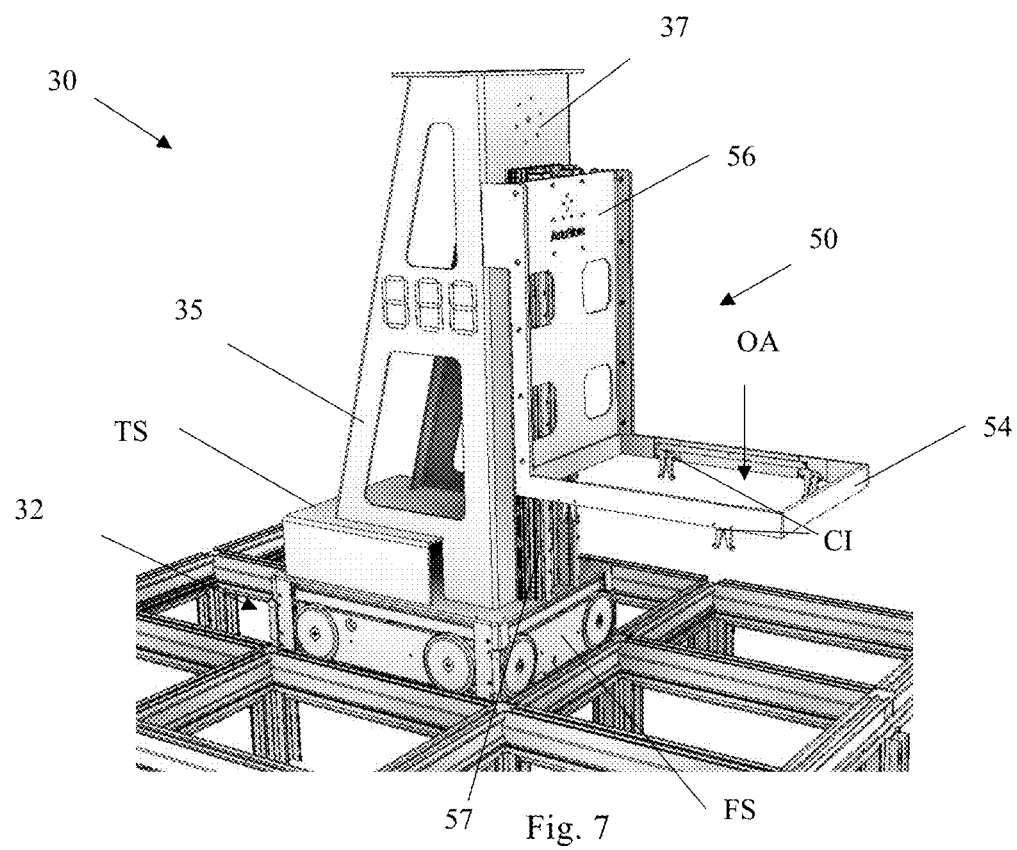
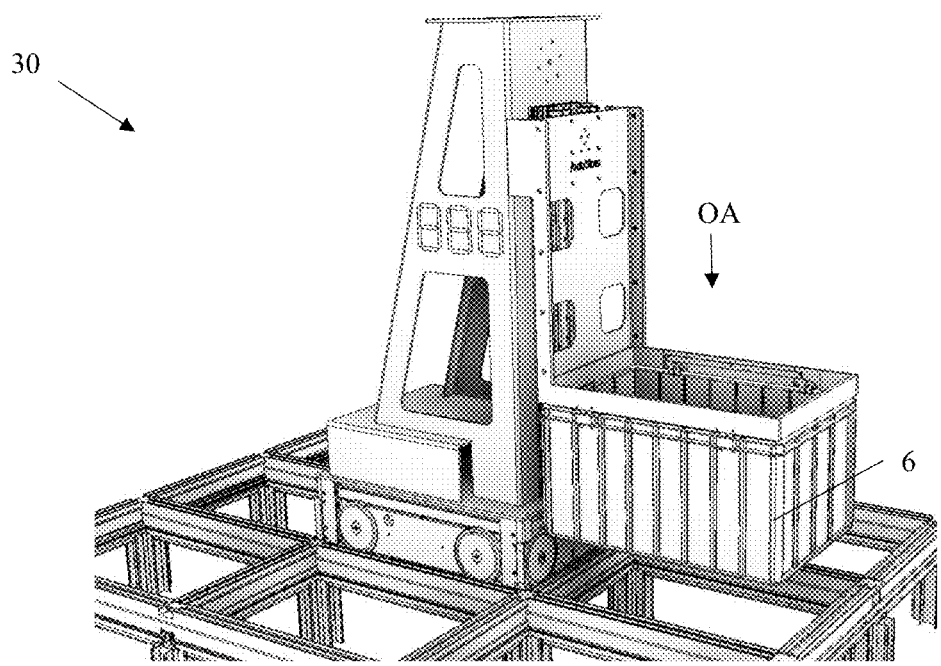
Fig. 8

AUTOMATED STORAGE AND RETRIEVAL SYSTEM

TECHNICAL FIELD

The present invention relates to a remotely operated vehicle assembly for an automated storage and retrieval system for moving a product item between a storage container stored in an automated storage and retrieval grid configured to store a plurality of stacks of storage containers. The present invention also relates to a method for moving a product item between a storage container stored in an automated storage and retrieval grid of an automated storage and retrieval system. The present invention also relates to an automated storage and retrieval system.

BACKGROUND AND PRIOR ART

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a container handling vehicle rail system 108 arranged in a grid pattern across the top of the storage 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 20,300 so that the position of the gripping/engaging devices with respect to the vehicle 200,300 can be adjusted in a third direction Z which is orthogonal the first direction X and the second direction Y.

Conventionally, and also for the purpose of this application, $Z=1$ identifies the uppermost layer of the grid 104, i.e. the layer immediately below the rail system 108, $Z=2$ the second layer below the rail system 108, $Z=3$ the third layer etc. In the exemplary prior art grid 104 disclosed in FIGS. 1A and 1C, $Z=8$ identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell $X=10, Y=2, Z=3$. The container handling vehicles 101 can be said to travel in layer $Z=0$ and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single track system, as is shown in FIG. 2A. Alternatively, the rail system 108 may be a double track system, as is shown in FIG. 2B, thus allowing a container handling vehicle 201 having a footprint 202,202' generally corresponding to the lateral area defined by a grid column 112 to travel along a row of grid columns even if another container handling vehicle 200 is positioned above a grid column neighboring that row. Both the single and double track system, or a combination comprising a single and double track arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of neighboring rails defining parallel rows of grid cells running in the X direction, and rails 111a and 111b form pairs of neighboring rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells 122 are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station (not shown), and the second delivery column 120 may comprise a dedicated pick-up port where the container handling vehicles 200,300 can pick up storage containers 106 that have been transported through the delivery column 120 from an access or a transfer station (not shown). Each of the ports of the first and second delivery column 119,120 may comprise a port suitable for both pick up and drop of storage containers 106.

The second location may typically be a picking or a stocking station where product items are removed from or positioned into the storage containers 106. In a picking or a stocking station, the storage containers 106 are normally never removed from the automated storage and retrieval system 1, but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106. A conveyor system comprising conveyors may be employed to transport the storage containers between the lower port of the delivery column 119,120 and the access station.

If the lower port of the delivery column 119,120 and the access station are located at different levels, the conveyor system may comprise a lift device for transporting the storage containers 106 vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, disclose an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105, or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding delivery columns to the grid, as this will allow the container handling vehicles 200,300 to be distributed among a larger number of ports of delivery columns in order to avoid congestion. However, if ports and columns are added, the conveyor system infrastructure must normally be increased. This requires space, which may not necessarily be available. Also, adding conveyor system infrastructure is costly.

Another problem with prior art automated storage and retrieval systems 1 is that the separate drop-off ports and pick-up ports of the delivery columns 119,120 require the container handling vehicles 200,300 to move to a storage column 105 after drop-off to retrieve a new storage container 106. Likewise, the container handling vehicles 200,300 have to be empty of a storage container 106 when they are sent to a pick-up port 120 to pick up a storage container. This results in an inefficiency and causes increased congestion around the ports, as container handling vehicles 200,300 are moving around on the grid without a storage container 106 as payload. In addition, the delivery columns 119,120 may take up space on the grid 104 which could be used for other purposes such as the movement of container handling vehicles 200,300.

It is known, for example from WO2016/198565, to provide the above automated storage and retrieval system with a robot device comprising a movable arm with a picking mechanism in one end thereof, for moving product items between storage containers 106. The robot device can be fixed to the grid or it can be fixed to the ceiling of the building in which the grid is located. The robot device in this prior art is used to move product items between storage containers 106 located on the top level of the grid and storage containers 106 located on a conveyor belt of a conveyor system.

Also here, the area surrounding the robot device may become congested with container handling vehicles 200,300 instructed to drop off or pick up storage containers 106. Moreover, adding conveyor system infrastructure is costly.

GB 2544648 (Ocado Innovation) discloses an automated storage and retrieval system with a robot device for picking product items where the robot device is fixed to a robot vehicle, thereby forming a picking vehicle. Container handling vehicles are moved adjacent to this picking vehicle and the picking vehicle moves product items between the containers held by the container handling vehicles. The container handling vehicles comprise a top opening allowing the picking vehicle to access the container from above.

There are several disadvantages with the above picking vehicle. First, at least three vehicles are used during the picking operation—the picking vehicle itself, and two container handling vehicles. In practice, it is assumed that the picking vehicle will be relatively stationary, while the container handling vehicles will be used to move desired containers to and from the picking vehicle.

In view of the above, it is desirable to provide an automated storage and retrieval system, and a method for operating such a system, that solve or at least mitigate one or more of the aforementioned problem related to use of prior art storage and retrieval systems.

An objective of the invention is to provide an automated storage and retrieval system which is more effective than prior art systems by avoiding or at least reducing congestion at specific locations of the grid.

An objective of the invention is also to reduce the risk of losing product items into an undesired container.

SUMMARY OF THE INVENTION

The present invention relates to a remotely operated vehicle assembly for an automated storage and retrieval system for moving a product item between a storage container stored in an automated storage and retrieval grid configured to store a plurality of stacks of storage containers, and target containers; wherein the remotely operated vehicle assembly comprises:
  a first vehicle comprising a vehicle body and a wheel arrangement connected to the vehicle body configured to move the remotely operated vehicle along a rail system of the automated storage and retrieval system;
  where the first vehicle comprises a container lifting device configured to carry a first target container;
  a picking system for moving the product item;
characterized in that:
  the vehicle assembly further comprises a second vehicle comprising a vehicle body and a wheel arrangement connected to the vehicle body configured to move the remotely operated vehicle along a rail system of the automated storage and retrieval system;
  the second vehicle comprises a container lifting device configured to carry a second target container;
  a bar system mechanically connecting the vehicles of the vehicle assembly to each other;
  the picking system is connected to the bar system;
  the picking system is configured to move the product item from the storage container to one of the first or second target container.

The first and second vehicles may each comprise a carrier section connected above their respective vehicle bodies. The bar system may be connected to the carrier sections of the respective vehicles. The bar system may be connected to an upper section of the respective carrier sections. The bar system may be connected to a top surface of the respective carrier sections.

The container lifting device may be connected to the carrier section of the respective vehicles. Alternatively, the container lifting device may be connected directly to the vehicle body. The container lifting device may be connected at a height below the bar system.

In one aspect, the picking system is positioned between the first and second vehicles.

In one aspect, product items are picked from storage containers located within a picking area of the grid, where the picking area is provided within the footprint area of the assembly. Alternatively, the picking area may be defined to be an area outside of the footprint area of the assembly.

In one aspect, each vehicle comprise a control system provided in communication with the control systems of other vehicles and in communication with a control system of the automated storage and retrieval system.

In one aspect, the assembly comprises a third vehicle and a fourth vehicle, where the bar system is mechanically connected to all four vehicles of the vehicle assembly, where the four vehicles together are provided in a rectangular configuration.

In one aspect, the picking system comprises a first picking arm with a holding mechanism, where a first end of the first picking arm is connected to the bar system and a second end of the first picking arm is connected to the holding mechanism.

In one aspect, the first picking arm comprises a first arm section pivotably connected to the bar system and a second arm section axially displaceable with respect to the first arm section.

The first arm section may be pivotable with respect to the bar system around a first vertical axis. The second arm section may be is axially displaceable with respect to the first arm section along a second vertical axis.

The picking arm may comprise three or more arm sections. These arm sections may be pivotably connected to each other or they may be axially displaceably connected to each other.

Two or more arm sections may be provided as telescopic sections. In yet an alternative, two or more arm sections may be slidably connected to each other, where a linear actuator is used to extend or retract the arm sections with respect to each other.

One of the arm sections may comprise a first arm element and a second arm element provided in parallel with each other, where a third arm element is connecting the first arm element with the second arm element. The first arm element and the second arm element are axially displaced in relation to each other. The first and second arm elements may be oriented in a vertical direction. The third arm element may be oriented in an inclining direction with respect to the horizontal plane. The third arm element may be provided in the horizontal plane. The first arm element may be rotatably connected to other arm sections or to the bar system. The second arm element may be connected to the holding device. When the first arm element is rotated, the second arm element is moved from a position above one storage container to a position above a different storage container.

In one aspect, the picking system comprises a second picking arm with a holding mechanism, where a first end of the second picking arm is connected to the bar system and a second end of the second picking arm is connected to its holding mechanism.

In one aspect, the assembly comprises a cover system for preventing the product item to fall into the grid. If a product item is lost in the grid during a picking operation, there is a risk that the product item will obstruct container handling vehicles during their horizontal movement or during vertical elevation and/or lowering of storage containers in the grid. If the product item falls into a storage container, that container must be identified and picked up by a container handling vehicle and moved to the picking robot or alternatively to a port for manual removal of the product item from the container.

In one aspect, the cover system comprises a door which in its closed state prevents the product item from falling into the grid and which in its open state allows access for the holding mechanism to a storage container stored in the grid below the door.

In one aspect, the container lifting device is an open-top container lifting device.

The term "open-top" here refers to a container lifting device where access to the container from above is possible through an access opening in the container lifting device.

In one aspect, the container lifting device is configured to lift the target container to a height above the top level of the grid.

The height may be sufficient for the vehicle to carry the further container during its horizontal movement on the grid.

In one aspect, the container lifting device is configured to lower the target container into a grid column of the grid.

In one aspect, the container lifting device is arranged as a cantilever structure fixed to the vehicle body, where the container lifting device comprises a container lifting frame with a connection interface CI for connection to and disconnection from the target container 6 provided below the cantilever structure.

In one aspect, the vehicle comprises a carrier section with a vertical plate structure provided adjacent to a front surface of the vehicle body; the container lifting device comprises a container lifting frame fixed to a vertical supporting structure; the supporting structure is connected to the vertical plate structure by means of a lifting mechanism for lowering the container lifting device and the supporting structure at least partially into a cell of the grid.

The present invention also relates to a method for moving a product item between a storage container stored in an automated storage and retrieval grid of an automated storage and retrieval system, where the grid is configured to store a plurality of stacks of storage containers, and a further container, where the method comprises the steps of:
- providing a vehicle assembly by connecting a first vehicle to a second vehicle by means of a bar system, the first and second vehicles each comprising a body and a wheel arrangement connected to the vehicle body and a container lifting device;
- connecting a picking system to the bar system, where the picking system comprises a holding mechanism and a picking arm where the picking arm has a first end connected to the bar system and a second end connected to the holding mechanism;
- moving the vehicle assembly along a rail system of the automated storage and retrieval system to a predetermined grid position;
- controlling the picking system to hold the product item being located at a initial container position,
- controlling the picking system to move the product item to a target container position and to release the product item at the target container position.

The term "container position" may be the position of a storage container stored in the grid or it may be the position of one of the target containers carried by the vehicle assembly. The "container position" may also be a predetermined location within the container, for example a predetermined compartment within the container, a predetermined shipping package located within the container etc. The initial grid position may be a position where both the initial container position and the target container position is within reach of the picking system.

The present invention also relates to a automated storage and retrieval system comprising:
- an automated storage and retrieval grid configured to store a plurality of stacks of storage containers;
- a vehicle assembly as defined above.

In the above aspects, the access opening is always open. However, in some embodiments, it may be possible to temporarily open and close the access opening by means of a lid or cover.

BRIEF DESCRIPTION OF THE DRAWINGS

The following drawings depict exemplary embodiments of the present invention and are appended to facilitate the understanding of the invention.

FIGS. 1A-D are perspectives view of a prior art automated storage and retrieval system, where FIG. 1A and FIG. 1C shows the complete system and FIG. 1B and FIG. 1D shows examples of system operable prior art container handling vehicles.

FIG. 2A shows a single track system, FIG. 2B shows a double track system 2B and FIG. 2C shows a double track system indicated width and length of a container handling vehicle grid cell.

FIGS. 7, 8 and 9 illustrates an alternative embodiment of a vehicle.

DETAILED DESCRIPTION OF THE INVENTION

Figure 2:
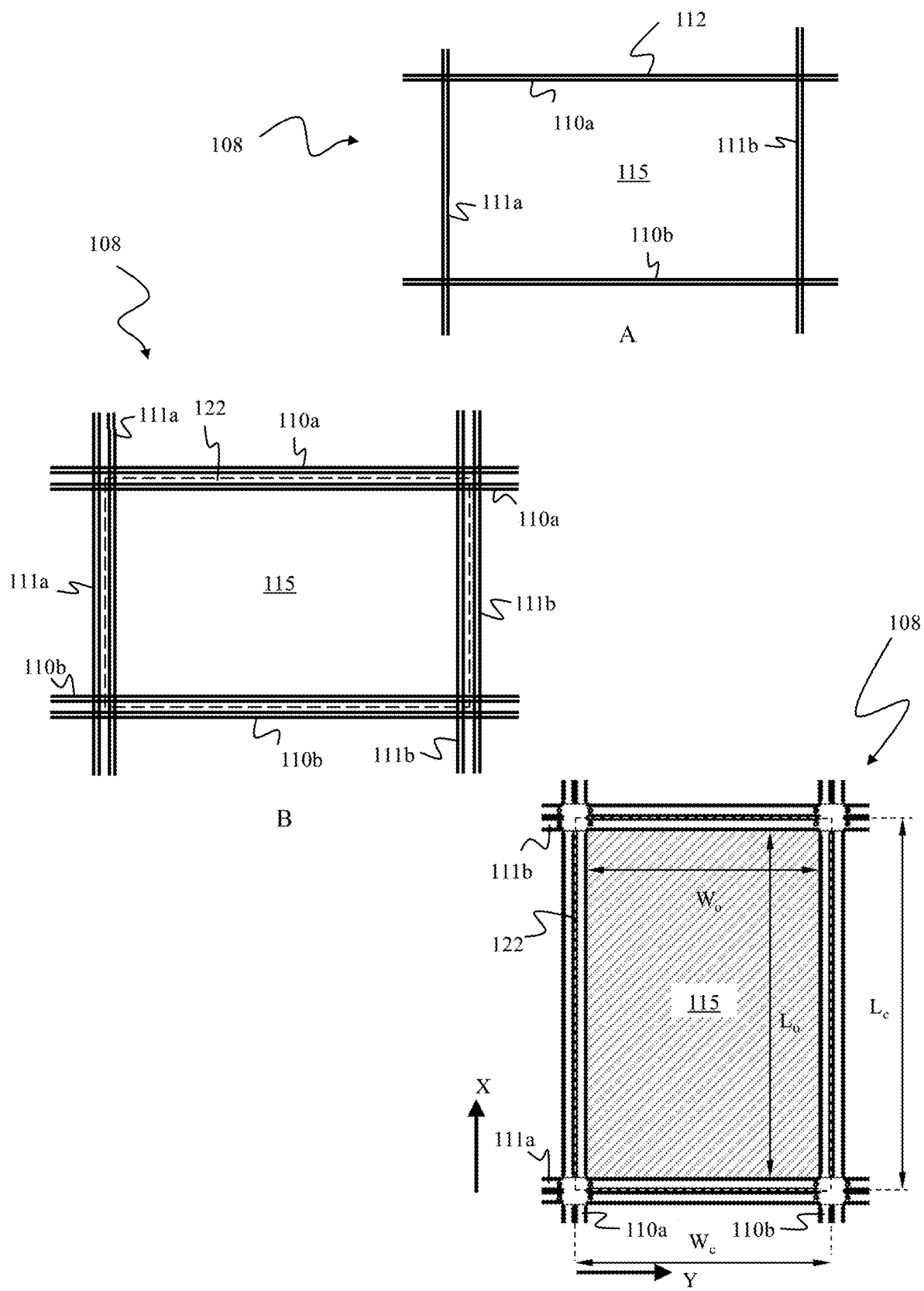
FIGS. 2A-C is a top view of a container handling vehicle rail system, where

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIG. 2). In FIGS. 1A and 1C, such a grid cell 122 is marked on the rail system 108 by thick lines.

The container handling vehicle rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

The rail system 108 may be a single track system, as is shown in FIG. 2A. Alternatively, the rail system 108 may be a double track system, as is shown in FIG. 2B. Details of the single and double track system are disclosed this specification under the section of background and prior art. In yet an alternative, the rail system 108 may be a combination of a double track system and a single track system.

In FIG. 1A, a control system of the automated storage and retrieval system 1 is shown as a box 20 provided in communication with the vehicles 200, 300.

First Embodiment

Figure 3:
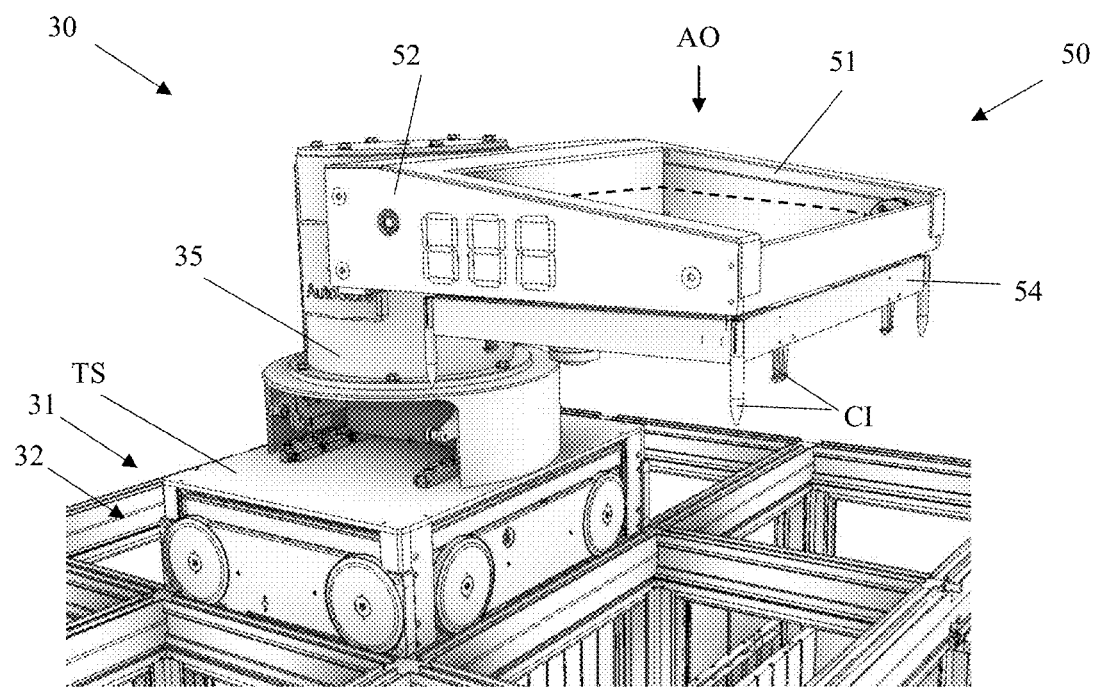
FIG. 3 illustrates a perspective front view of a first embodiment of a vehicle.

It is now referred to FIG. 3. Here, a remotely operated vehicle 30 for the above automated storage and retrieval system 1 is disclosed. This vehicle 30 is a part of a vehicle assembly 10 shown in FIG. 5, which will be described in detail below. The main purpose of the vehicle assembly 10 is to perform a picking operation, i.e. to move one or several of the same type of product item, or to move several types of product items, from one or several storage containers 106 stored in the grid 104 to a target container 6. Hence, this vehicle assembly 10 may be referred to as a picking vehicle. This picking operation is typically performed based on a picking order, where one or several product items is picked, packaged into a shipping package and then sent to the address of the receiver who typically placed the picking order.

It should be noted that in the present embodiment, the storage containers 106 and the target container 6 are of the same type.

The remotely operated vehicle 30 comprises a vehicle body 31 and a wheel arrangement 32 connected to the vehicle body 31. The wheel arrangement is configured to move the remotely operated vehicle 30 along the rail system 108 of the automated storage and retrieval system 1. The vehicle 30 with its wheel arrangement 32 is considered prior art and will not be described herein detail.

The vehicle body 31 comprises a carrier section 35 mounted to an upwardly facing surface 31a of the vehicle body 31 above the wheel arrangement 32.

The vehicle 30 further comprises a container lifting device 50 configured to lift the target container 6. The container lifting device 50 is an open-top container lifting device 50, i.e. it has an access opening AO to the target container 6 from above.

The container lifting device 50 comprises a container lifting frame 54 with a connection interface CI for connection to and disconnection from the target container 6. The container lifting device 50 is configured to lift the target container 6 to a height H1 (see FIG. 1) above the top level of the grid 104 in order to carry the target container 6 during horizontal movement of the vehicle 30.

Figure 5:
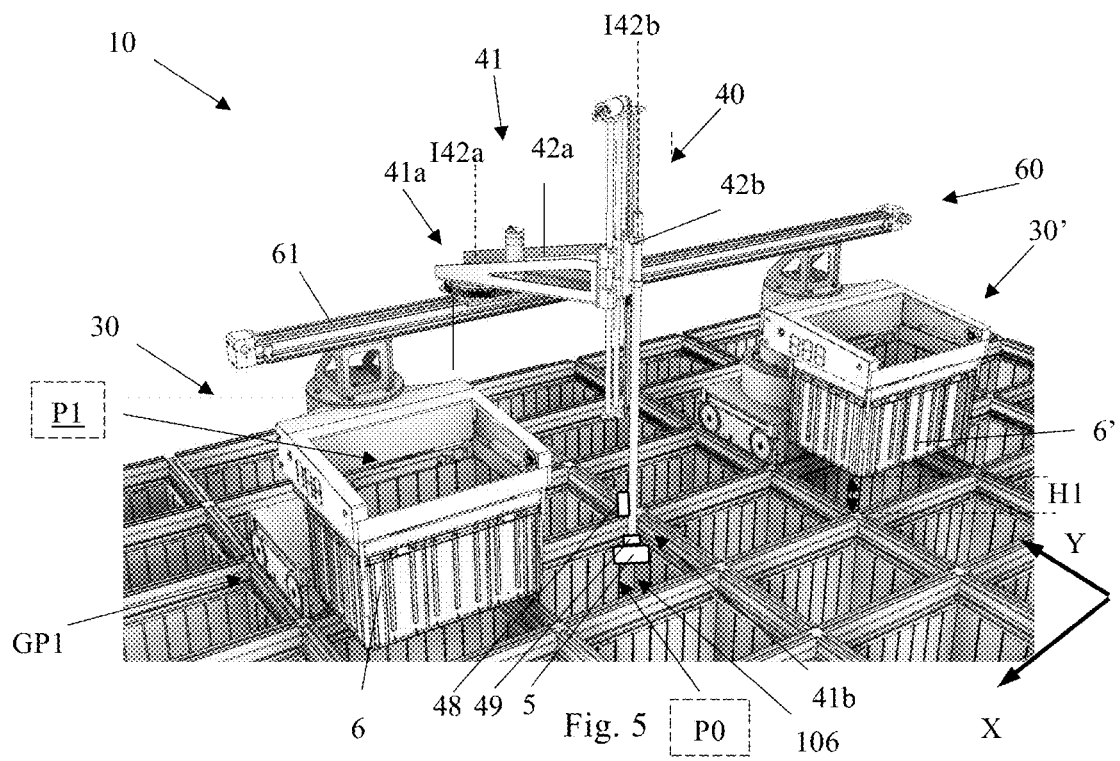
FIG. 5 illustrates a first embodiment of a vehicle assembly with two vehicles.

In FIG. 5, this height H1 is indicated as the vertical distance between the grid 104 and the lowermost part of the container 6'. The container lifting device 50 is also configured to lower its connection interface into a grid column 105 of the grid 104 for connection to a target container 6 (for example an empty storage container 106 which are to be used as a new target container 6) or for storing the target container 6 temporarily in the grid.

The container lifting device 50 comprises a frame section 51 and a housing section 52 connected to each other. The access opening AO to the target container 6 is defined through the frame section 51. The housing section 52 is connected to the carrier section 35 of the vehicle body 31. As shown, the frame section 51 here forms a cantilever type of structure, similar to the prior art vehicle 200, where a container lifting frame 54 is suspended below the frame section 51. Motors and other parts of the container lifting device 50 are located inside the frame section 51 and/or housing section 52. This enables the cross sectional area of the access opening AO in the frame section 51 to substantially equal to a cross sectional area of the access opening of the lifting frame 54 and/or the target container 6.

Figure 4:
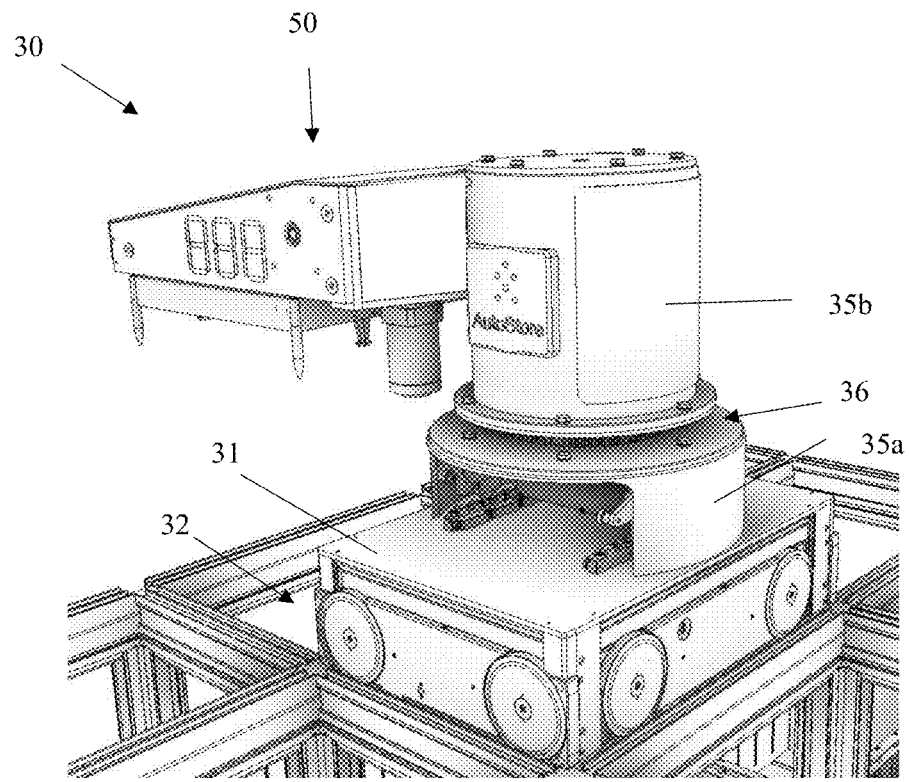
FIG. 4 illustrates a perspective rear view of an alternative embodiment of FIG. 3.

It is now referred to FIG. 4. Here, an alternative embodiment of the carrier section 35 is shown, where the carrier section 35 comprises a lower carrier section 35a fixed to the upwardly facing surface 31a above the wheel arrangement 32 and an upper carrier section 35b connected to the housing section 52 of the container lifting device 50. The upper and lower carrier sections 35a, 35b are separated by a pivoting mechanism 36, allowing the upper carrier section 35b, and hence the container lifting device 50, to rotate in relation to the lower carrier section 35a. In FIG. 4, it is shown that the upper carrier section 35b has been rotated 180° when compared to the embodiment of FIG. 3.

It is now referred to FIG. 5. Here, the remotely operated vehicle assembly 10 is shown to comprise a first vehicle 30 and a second vehicle 30', which may either be of the type shown in FIG. 3 or in FIG. 4.

It is further shown that the vehicle assembly 10 comprises a bar system 60 which connects the vehicles 30, 30' of the vehicle assembly 10 to each other. In FIG. 5, the bar system 60 comprises a first bar 61 connected between the carrier sections 35 of the vehicles 30, 30'. It should be noted that the assembly 10 may move horizontally with respect to the grid by means of their wheel arrangements 32.

The vehicle assembly 10 further comprises a picking system 40 for moving a product item 5 between the storage container 106 in the grid to one of the target containers 6, 6' carried by the first and second vehicle 30, 30'. The picking system 40 comprises a picking arm 41 having a first end 41a connected to the vehicle body 31 and a second end 41b connected to a holding mechanism 49 of the picking system 40.

The picking arm 41 comprises several arm sections pivotably connected to each other. In FIG. 5, it is shown that the picking arm 41 comprises a first arm section 42a pivotably connected to the bar 61 and a second arm section 42b axially displaceable with respect to the first arm section 42a, where the holding mechanism 49 is located in the end of the second arm section 42b. In the present embodiment, the first arm section 42a is pivotable with respect to the bar 61 around a first vertical axis I42a, the second arm section 42b is axially displaceable with respect to the first arm section 42a along a second vertical axis I42b.

Figure 14:
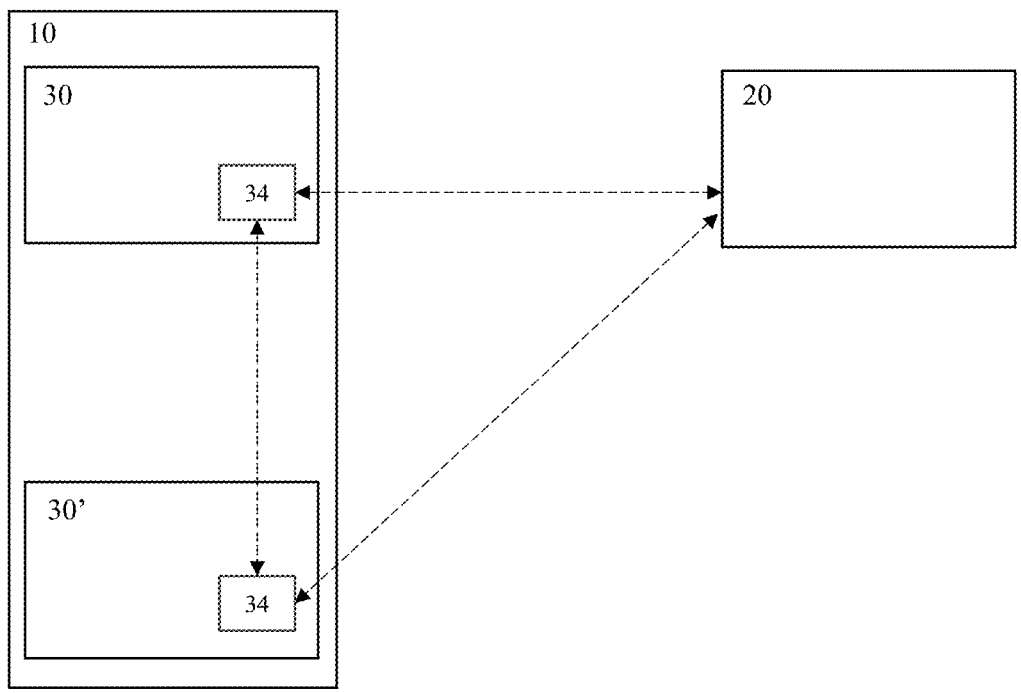
FIG. 14 illustrates communication between vehicles of the assembly and communication between the vehicles and the control system of the automated storage and retrieval system.

It is now referred to FIG. 14, where it is schematically shown an assembly 10 with two vehicles 30, 30', where each vehicle 30, 30' comprises a vehicle control system 34 provided in communication (indicated by dashed arrows) with each other and with other parts of the control system 20 of the automated storage and retrieval system 1. For example, in order to control the horizontal movement of the assembly, the wheel arrangements 32 of the two vehicles 30, 30' must be coordinated, as the vehicles must move in parallel when moving the assembly 10 in the Y-direction and move along a common line when moving the assembly 10 in the X-direction. It should be noted that picking arms with holding mechanisms are commercially available—and are considered prior art. Hence, the control of such picking arms with holding mechanism will not be described in detail herein.

The holding mechanism 49 is configured to releasably hold the product item 5, and can use one of many known holding principles, such as by using a suction force provided by an air pump, a magnetic force provided by an electromagnet, a clamping force by using a claw operated by electric servo motors etc. It may use a combination of two or more of these holding principles. In addition, the picking system 40 may comprise object recognition equipment 48 (shown in FIG. 4b) for recognizing the product item 5 in order to control the positioning of the picking arm and the holding mechanism 49 in relation to the product item 5 in order to hold it. The object recognition equipment 48 may also be used during release of the product item 5, for example in cases where the product items 5 are released into a shipping package (not shown) provided inside the target container 6. This shipping package may be a cardboard box, a rigid or semi-rigid bag, an envelope etc. The shipping package may be individually marked, in order for the picking system 40 to release the product item 5 into one specific shipping package of a plurality of shipping packages provided in the target container 6.

It should be noted that the object recognition equipment 48 and the holding mechanism 49 should be selected based on the properties of the product items stored in the automated storage and retrieval system 1, such as size, weight, shape, color, packaging material etc.

The picking operation will now be described. First, it should be noted that the storage containers 106 from which product items 5 is to be picked from, must be positioned at a height in the grid 104 which is within reach of the picking system 40 of the assembly 10. This is typically performed by using container handling vehicles 200, 300 to stack storage containers 106 above each other to the desired height and then position the storage container 106 from which product items 5 is to be picked from, on top of the stack. Product items 5 located in storage containers 106 provided at the first and second levels, indicated in FIG. 1 as levels z0 and z1, are typically within reach of the picking system 40.

The position of the product item 5 that is to be picked may be referred to as an initial container position P0, which in FIG. 5 is indicated to be the position of the storage container 106. The target container position P1 is the position of the target container 6 carried by the first vehicle 30.

Initially, the vehicle assembly 10 is moved to a predetermined grid position GP1. In this example, the initial grid position GP1 is a position where the storage container 106 is within reach of the picking system 40, as shown in FIG. 5.

Then, the holding mechanism 49 is positioned in relation to the product item 5 in the storage container 106 by means of the picking arm 41 based on data from the object recognition equipment 48 and the holding mechanism 49 is subsequently activated to hold the product item 5. The picking arm 41 is then actuated to lift the product item 5 up from the storage container 106 and into the target container 6, where the holding mechanism 49 is deactivated to release the product item 5.

As the assembly 10 in FIG. 5 has two target containers 6, 6', movement of the assembly may be reduced, as the same type of product items 5 can be picked from one storage container 106 and into both target containers, without moving the assembly 10 in relation to the grid—only the picking system 40 is moved. When the picking operation into one target container is finished, the assembly may leave the target container in the grid and start a new picking operation with a new target container. Other container handling vehicles may transport the target container to its final destination and may also supply the picking assembly with new target containers when needed.

Second Embodiment

Figure 6:
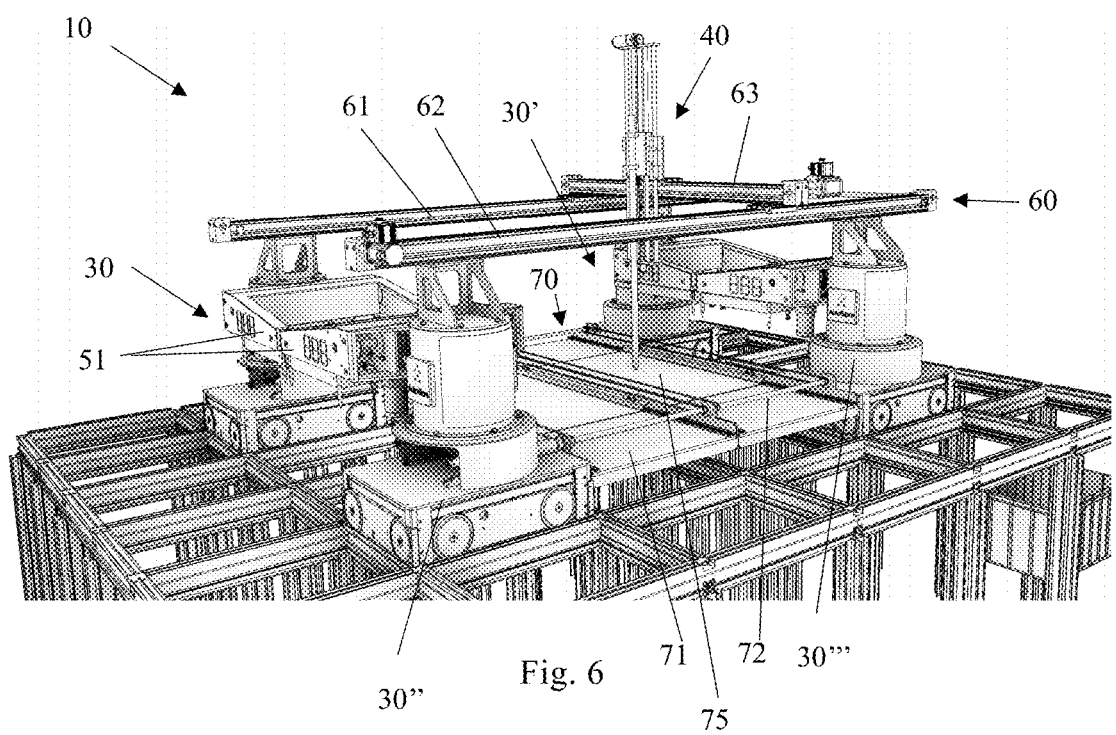
FIG. 6 illustrates a second embodiment of a vehicle assembly with four vehicles and a grid cover system.

It is now referred to FIG. 6. Here it is shown that the assembly 10 comprises four vehicles 30, 30', 30", 30'" of the type shown in FIG. 3 provided in a rectangular configuration with each vehicle forming a corner of a rectangle. Here, the target containers are not shown.

The bar system 60 comprises a first bar 61 connecting the first and second vehicles 30, 30', a second bar 62 connecting the third and fourth vehicle 30", 30'" and a third bar 63 connecting the first and second bars 61, 62 to each other.

The assembly 10 comprises one common picking system 40 of similar type to the one described above.

Here, the frame sections 51 of the first and third vehicles 30 are provided adjacent to, or in contact with each other, in order to prevent product items 5 falling into the grid in case the product item 5 becomes unintentionally released from the holding mechanism. If this happens, the product item will fall into one of the two target containers held by the vehicles 30, 30". The frame sections 51 of the second and fourth vehicles are arranged in similar manner.

The assembly 10 further comprises a cover system 70 for preventing the product item falling into the grid 104. The cover system comprises cover sections 71, 72 connected between the vehicles, where the cover sections 71 and 72 prevent product items unintentionally falling into the grid 104 in the event that a product item becomes unintentionally released from the holding mechanism.

The cover system 70 further comprises a door 75 which in its closed state prevents the product item falling into the grid 104 and which in its open state allows access for the holding mechanism 49 to a storage container 106 stored in the grid 104 below the door 75.

Fourth Embodiment

Figure 9:
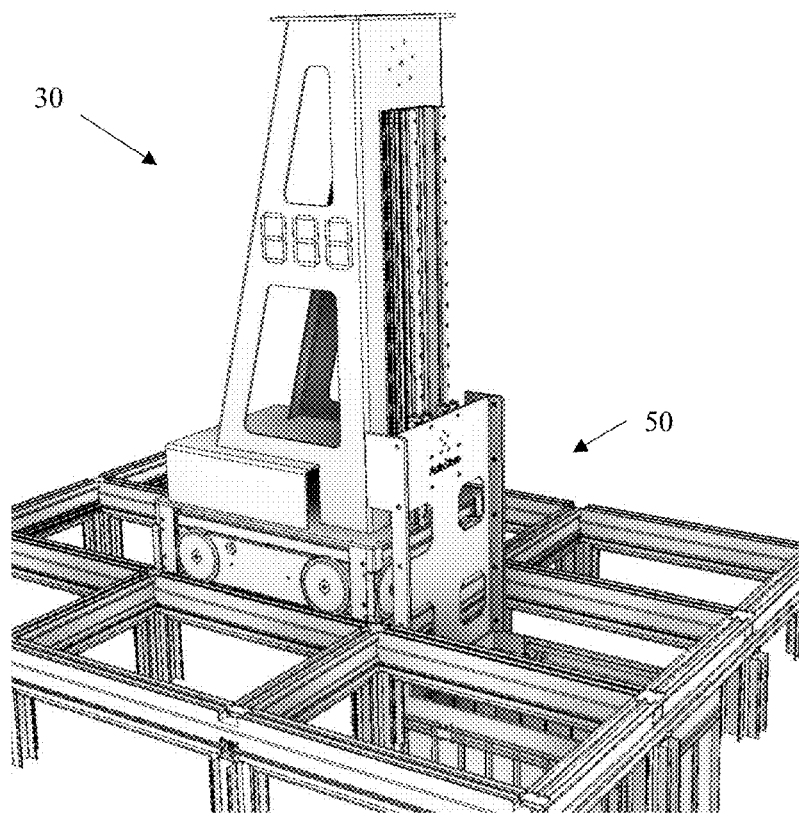

It is now referred to FIGS. 7, 8 and 9, illustrating an alternative embodiment of a vehicle 30 for a vehicle assembly 10.

In this embodiment, the carrier section 35 comprises a rigid tower structure fixed to the top surface TS of the vehicle body 31. The carrier section 35 has a vertical plate structure 37 provided adjacent to, or aligned with, a front surface FS of the vehicle body 31.

In this embodiment, the container lifting device 50 comprises a container lifting frame 54 with its connection interface CI fixed to the lower end of the container lifting frame 54, similar to the embodiment above. The container lifting frame 54 is also here axially displaceable up and down with respect to the carrier section 35. However, here the container lifting frame 54 is not suspended below a lifting frame 51; the container lifting frame 54 is here fixed to a supporting structure 56 extending vertically. The container lifting device 54 and the supporting structure 56 forms a rigid structure which is adapted to be at least partially lowered into a cell of the grid 104 in order to pick up or put away a target container 6. The supporting structure 56 is connected to the vertical plate structure 37 by means of a lifting mechanism 57, where one part of the lifting mechanism 57 is fixed to the plate structure 37 and another part of the lifting mechanism 57 is fixed to a side of the supporting structure 56 facing towards the plate structure 57. The lifting mechanism 57 may be an electric servo motor, an electric linear motor etc.

FIGS. 8 and 9 show how the target container 6 can be elevated and lowered with respect to the grid.

Figure 10:
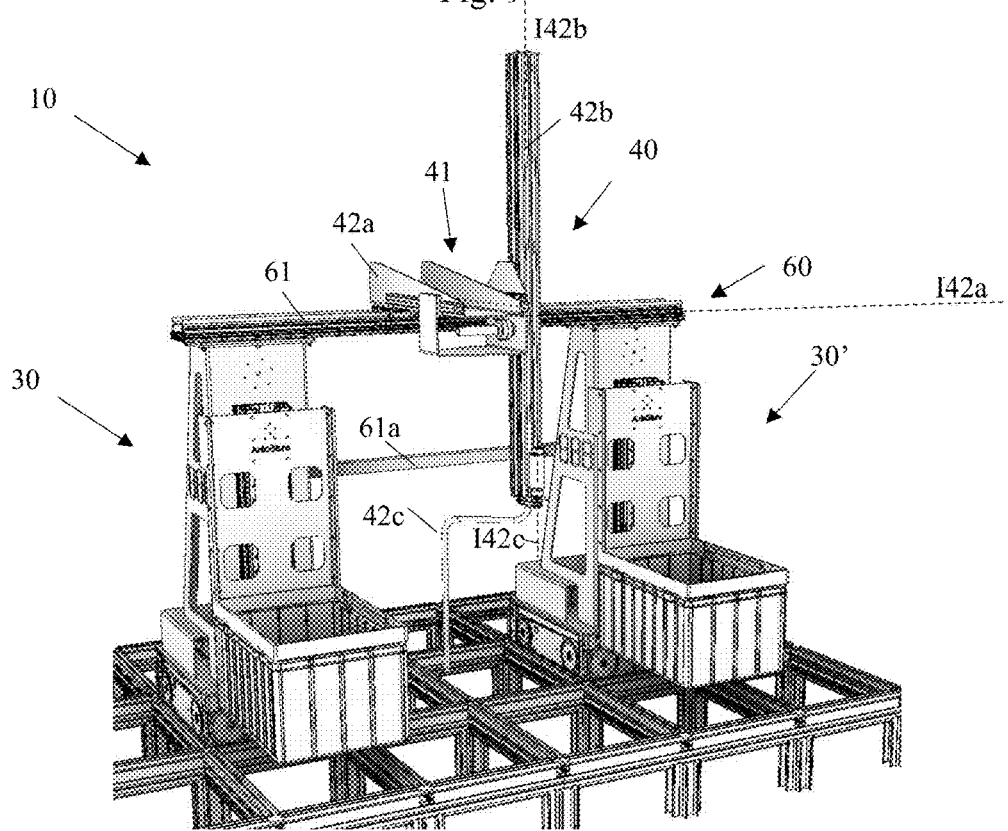
FIG. 10 illustrates an alternative embodiment of a vehicle assembly with two vehicles.

In FIG. 10, a vehicle assembly 10 comprising two vehicles 30, 30' is shown. The vehicle assembly 10 comprises a bar system 60 with a bar 61 connected between the carrier sections 35. An additional bar element 61a is connected between the carrier sections 35.

The picking arm 41 of the picking system 40 here comprises a first arm section 42a axially displaceable with respect to the bar 61 along a first, horizontal axis I42a, a second arm section 42b axially displaceable with respect to the first arm section 42a along a second, vertical axis I42b and a third arm section 42c pivotably connected to the second arm section 42b around a third, vertical axis I42c.

Figure 15:
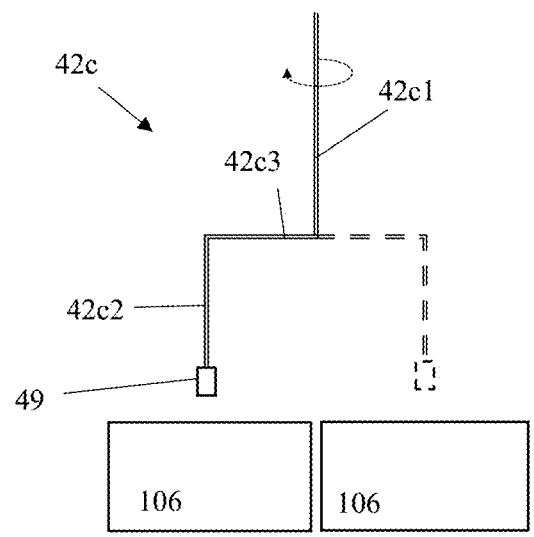
FIG. 15 illustrates a detail of the third arm section of FIG. 10.

It is now referred to FIG. 15, where the third arm section 42c of FIG. 10 is shown in detail. Here the third arm section 42c comprises a first arm element 42c1 and a second arm element 42c2 oriented in parallel with each other, where a third arm element 42c3 is connecting the first arm element 42c1 with the second arm element 42c2. The first arm element is located above the second arm element. The first and second arm elements are oriented in a vertical direction. The third arm element 42c3 is oriented horizontally. As is apparent from the description above, the first arm element 41c1 is pivotably connected to the second arm section 42b. The holding device 49 is connected to the lower end of the second arm element. When the first arm element is rotated, as indicated by dashed arrow in FIG. 15 and with dashed second and third arm elements in FIG. 15, the second arm element is moved from a position above one storage container 106 to a position above a different storage container 106.

Figures 16A, 16B:
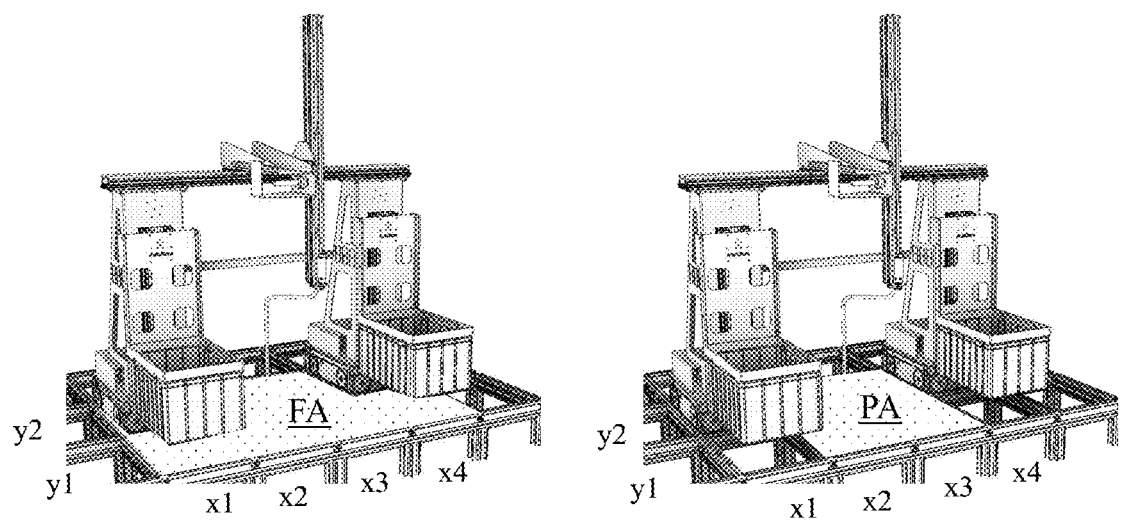
FIG. 16a illustrates the footprint area of the vehicle assembly of FIG. 10.
FIG. 16b illustrates an example of a picking area of the vehicle assembly of FIG. 10.

It is now referred to FIG. 16a. Here, the footprint, i.e. the extent in x- and y-direction, is indicated as a footprint area FA being two cells long in the y-direction (y1, y1) and four items cells wide in the x-direction (x1, x2, x3, x4), i.e. a total of eight cells. It should be noted that the cells below the vehicles 30 and below the target containers 6 are a part of this footprint area FA.

In FIG. 16b, a picking area PA is defined to be the area between the vehicles and storage containers, i.e. two cells long in the y-direction (y1, y1) and two cells wide in the x-direction (x2, x3).

Fifth Embodiment

Figure 11:
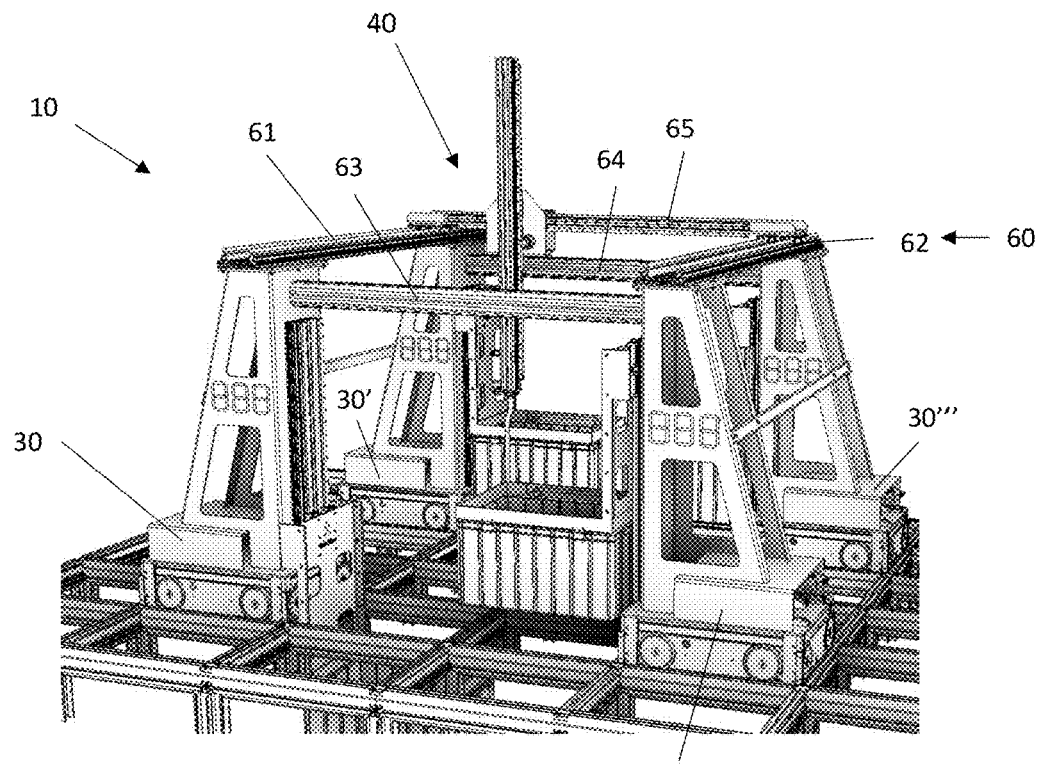
FIG. 11 illustrates an alternative embodiment of a vehicle assembly with four vehicles.
Figure 12:
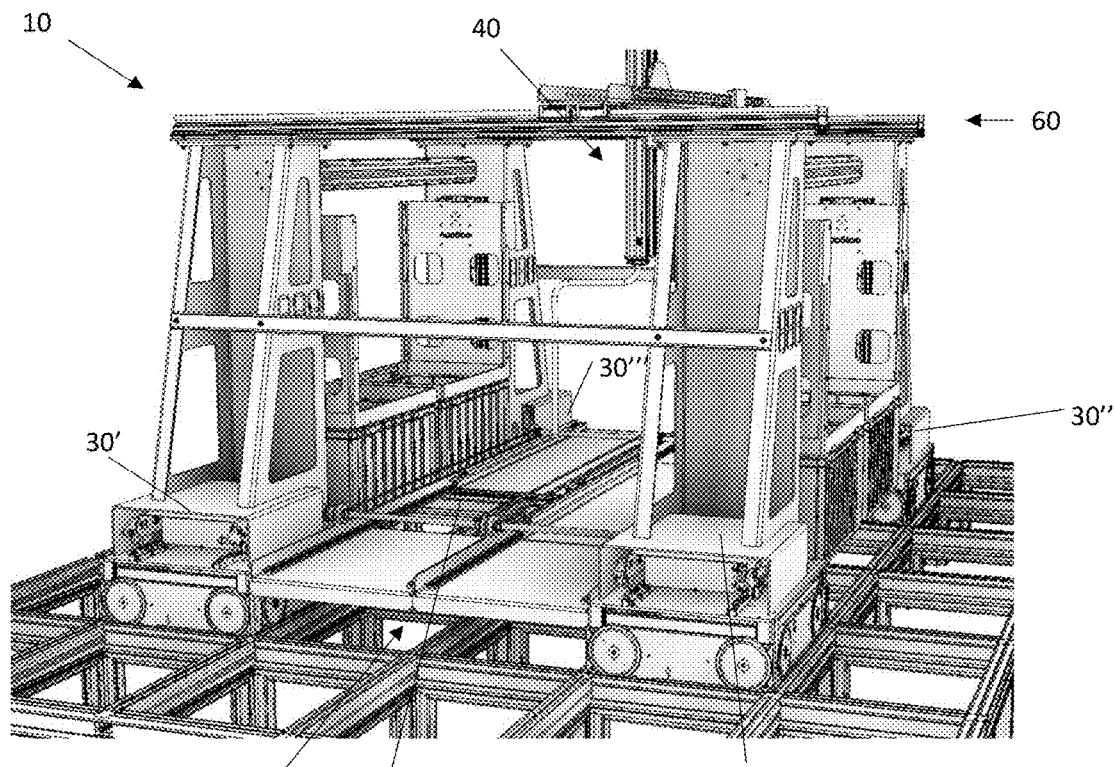
FIG. 12 illustrates the embodiment of FIG. 11 with a grid cover system.

It is now referred to FIG. 11. Here, the vehicle assembly 10 comprises four vehicles 30, 30', 30", 30''' in a rectangular configuration, similar to FIG. 6.

The bar system 60 comprises a first bar 61 connecting the first and second vehicles 30, 30', a second bar 62 connecting the third and fourth vehicle 30", 30", a third bar 63 connecting the first and third vehicles 30, 30" to each other and a fourth bar 64 connecting the second and fourth vehicles 30', 30''' to each other. The first and second bars are parallel to each other and the third and fourth bars are parallel to each other.

The picking system 40 is similar to the picking system 40 of FIG. 10. However, here, the first arm section 42a is axially displaceable with respect to a fifth bar 65, which itself is axially displaceable with respect to the first and second bars 61, 62.

In FIG. 11, it is shown that the assembly 10 comprises a cover system 70, as described above with respect to FIG. 6.

Sixth Embodiment

Figure 13:
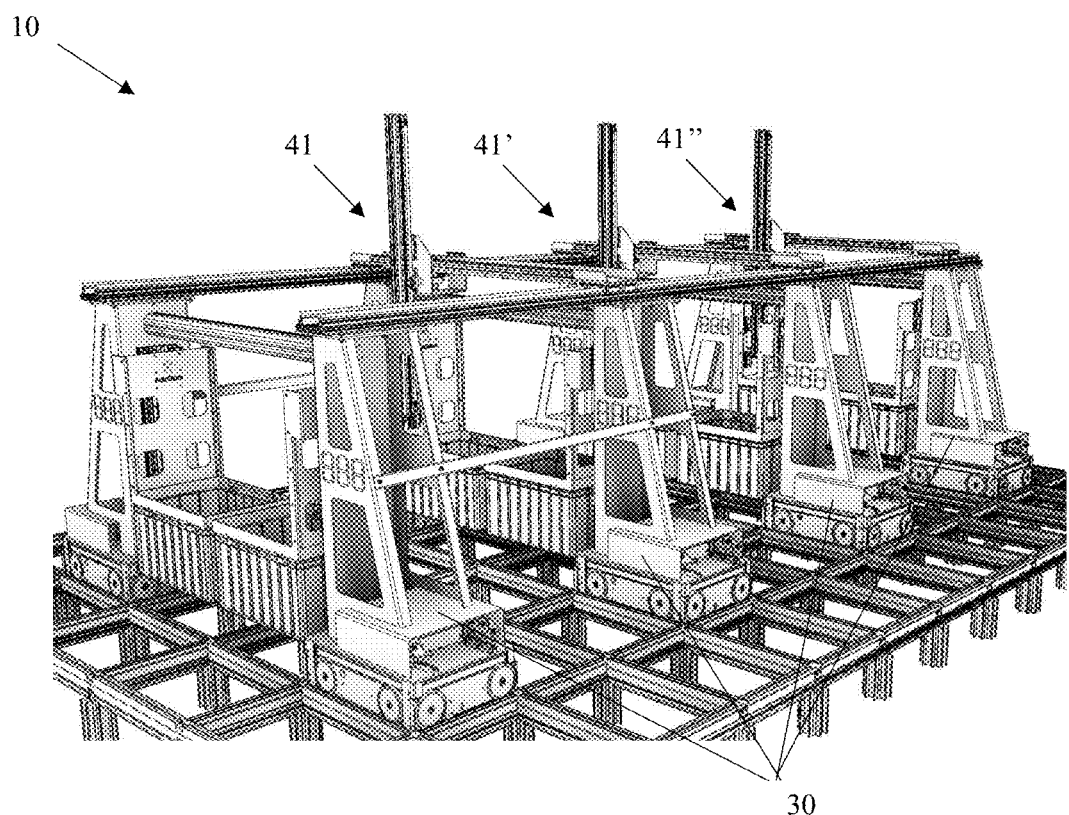
FIG. 13 illustrates an alternative embodiment of a vehicle assembly with eight vehicles.

It is now referred to FIG. 13. Here, the vehicle assembly comprises eight vehicles 30 and a picking system 40 with three picking arms 41, 41', 41".

According to the embodiments described above, several picking orders may be performed in parallel, as picking is performed to several target containers at the same time. When the picking order into one target container is finished, that container lifting device 50 may leave the target container in the grid and retrieve a new empty target container for new product orders. Other container handing vehicles will transport the target container to its final destination and may also supply the picking vehicle with new target containers when needed.

ALTERNATIVE EMBODIMENTS

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

REFERENCE NUMERALS 1 storage and retrieval system
5 product item
6 target container
10 vehicle assembly
20 control system
30 first vehicle
30' second vehicle
30" third vehicle,
30''' fourth vehicle
31 vehicle body
31a upwardly facing surface
32 wheel arrangement
34 vehicle control system
35 carrier section
35a lower carrier section
35b upper carrier section
36 pivoting mechanism
37 vertical plate structure
40 picking system
41 picking arm
41a first end
41b second end
41c1 first arm element
42a first arm section
42b second arm section
42c third arm section
42c1 first arm element
42c2 second arm element
42c3 third arm element
48 object recognition equipment
49 holding mechanism
50 container lifting device
50 open-top container lifting device
51 frame section
52 housing section
54 lifting frame
56 supporting structure
57 plate structure
60 bar system
61 first bar
61a additional bar element
62 second bar
63 third bar
64 fourth bar
65 fifth bar
70 cover system
71 cover section
72 cover section
75 door
100 Framework structure
102 Upright members of framework structure
103 Horizontal members of framework structure
104 Storage grid/three-dimensional grid
105 Storage column
106 Storage container
107 Stack
108 Rail system/Container handling vehicle rail system
110 First set of parallel rails in first direction X
110a First neighboring rail of first set
110b Second neighboring rail of first set
111 Second set of parallel rails in second direction Y
111a First neighboring rail of second set
111b Second neighboring rail of second set
115 Grid opening/Container handling vehicle grid opening
119 Delivery column
120 Delivery column
122 Grid cell/Container handling vehicle grid cell
140 Delivery system
150 Delivery port 200 First container handling vehicle
201 Wheel arrangement
300 Second container handling vehicle
301 Wheel arrangement
X First direction
Y Second direction
P Horizontal plane of rail system
$W_o$ Width of container handling vehicle grid opening
We Width of container handling vehicle grid cell
$L_o$ Length of container handling vehicle grid opening
$L_c$ Length of container handling vehicle grid cell
AO access opening
CI connection interface
FA footprint area
FS front surface
GP1 predetermined grid position
GP1 initial grid position
PA picking area
TS top surface
H1 height
P0 initial container position
P1 target container position

The invention claimed is:

1. A remotely operated vehicle assembly for an automated storage and retrieval system for moving a product item between a storage container stored in an automated storage and retrieval grid configured to store a plurality of stacks of storage containers, and target containers; wherein the remotely operated vehicle assembly comprises:
a first vehicle comprising a vehicle body and a wheel arrangement connected to the vehicle body configured to move the remotely operated vehicle along a rail system of the automated storage and retrieval system; wherein the first vehicle comprises a container lifting device configured to carry a first target container; and
a picking system for moving the product item;
wherein the vehicle assembly further comprises a second vehicle comprising a vehicle body and a wheel arrangement connected to the vehicle body configured to move the remotely operated vehicle along a rail system of the automated storage and retrieval system;
wherein the second vehicle comprises a container lifting device configured to carry a second target container;
wherein a bar system mechanically connecting the vehicles of the vehicle assembly to each other;
wherein the picking system is connected to the bar system; and
wherein the picking system is configured to move the product item from the storage container to one of the first or second target container.

2. The remotely operated vehicle assembly according to claim 1, wherein the picking system is positioned between the first and second vehicles.

3. The remotely operated vehicle assembly according to claim 1, wherein each vehicle comprise a control system provided in communication with the control systems of other vehicles and in communication with a control system of the automated storage and retrieval system.

4. The remotely operated vehicle assembly according to claim 1, wherein the assembly comprises a third vehicle and a fourth vehicle, wherein the bar system is mechanically connected to all four vehicles of the vehicle assembly, and wherein the four vehicles together are provided in a rectangular configuration.

5. The remotely operated vehicle assembly according to claim 1, wherein the picking system comprises a first picking arm with a holding mechanism, and wherein a first end of the first picking arm is connected to the bar system and a second end of the first picking arm is connected to the holding mechanism.

6. The remotely operated vehicle assembly according to claim 5, wherein the first picking arm comprises a first arm section pivotably connected to the bar system and a second arm section axially displaceable with respect to the first arm section.

7. The remotely operated vehicle assembly according to claim 1, wherein the picking system comprises a second picking arm with a holding mechanism, wherein a first end of the second picking arm is connected to the bar system and a second end of the second picking arm is connected to its holding mechanism.

8. The remotely operated vehicle assembly according to claim 1, wherein the assembly comprises a cover system for preventing the product item to fall into the grid.

9. The remotely operated vehicle assembly according to claim 1, wherein the cover system comprises a door which in its closed state is preventing the product item to fall into the grid and which in its open state allows access for the holding mechanism to a storage container stored in the grid below the door.

10. The remotely operated vehicle assembly according to claim 1, wherein the container lifting device is an open-top container lifting device.

11. The remotely operated vehicle assembly according to claim 1, wherein the container lifting device is configured to lift the target container to a height (H1) above the top level of the grid.

12. The remotely operated vehicle assembly according to claim 1, wherein the container lifting device is configured to lower the target container into a grid column of the grid.

13. The remotely operated vehicle assembly according to claim 1, wherein the container lifting device is arranged as a cantilever structure (51) fixed to the vehicle body, and wherein the container lifting device comprises a container lifting frame with a connection interface for connection to and disconnection from the target container provided below the cantilever structure.

14. The remotely operated vehicle assembly according to claim 1, wherein:
the vehicle comprises a carrier section with a vertical plate structure provided adjacent to a front surface of the vehicle body;
the container lifting device comprises a container lifting frame fixed to a vertical supporting structure; and
the supporting structure is connected to the vertical plate structure by means of a lifting mechanism for lowering the container lifting device and the supporting structure at least partially into a cell of the grid.

15. An automated storage and retrieval system comprising:
an automated storage and retrieval grid configured to store a plurality of stacks of storage containers; and
a vehicle assembly according to claim 1.

16. A method for moving a product item between a storage container stored in an automated storage and retrieval grid of an automated storage and retrieval system, wherein the grid is configured to store a plurality of stacks of storage containers, and a further container, wherein the method comprises the steps of:
providing a vehicle assembly by connecting a first vehicle to a second vehicle by means of a bar system, the first and second vehicles each comprising a body and a wheel arrangement connected to the vehicle body and a container lifting device;

connecting a picking system to the bar system, wherein the picking system comprises a holding mechanism and a picking arm, wherein the picking arm has a first end connected to the bar system and a second end (41*b*) connected to the holding mechanism;

moving the vehicle assembly along a rail system of the automated storage and retrieval system to a predetermined grid position (GP1);

controlling the picking system to hold the product item being located at an initial container position (P0), and controlling the picking system to move the product item to a target container position (P1) and to release the product item at the target container position (P1).

* * * * *